April 29, 1924.
J. P. TARBOX
BALANCING MECHANISM FOR AIRCRAFT
Original Filed Feb. 7, 1913    2 Sheets-Sheet 1
1,492,006
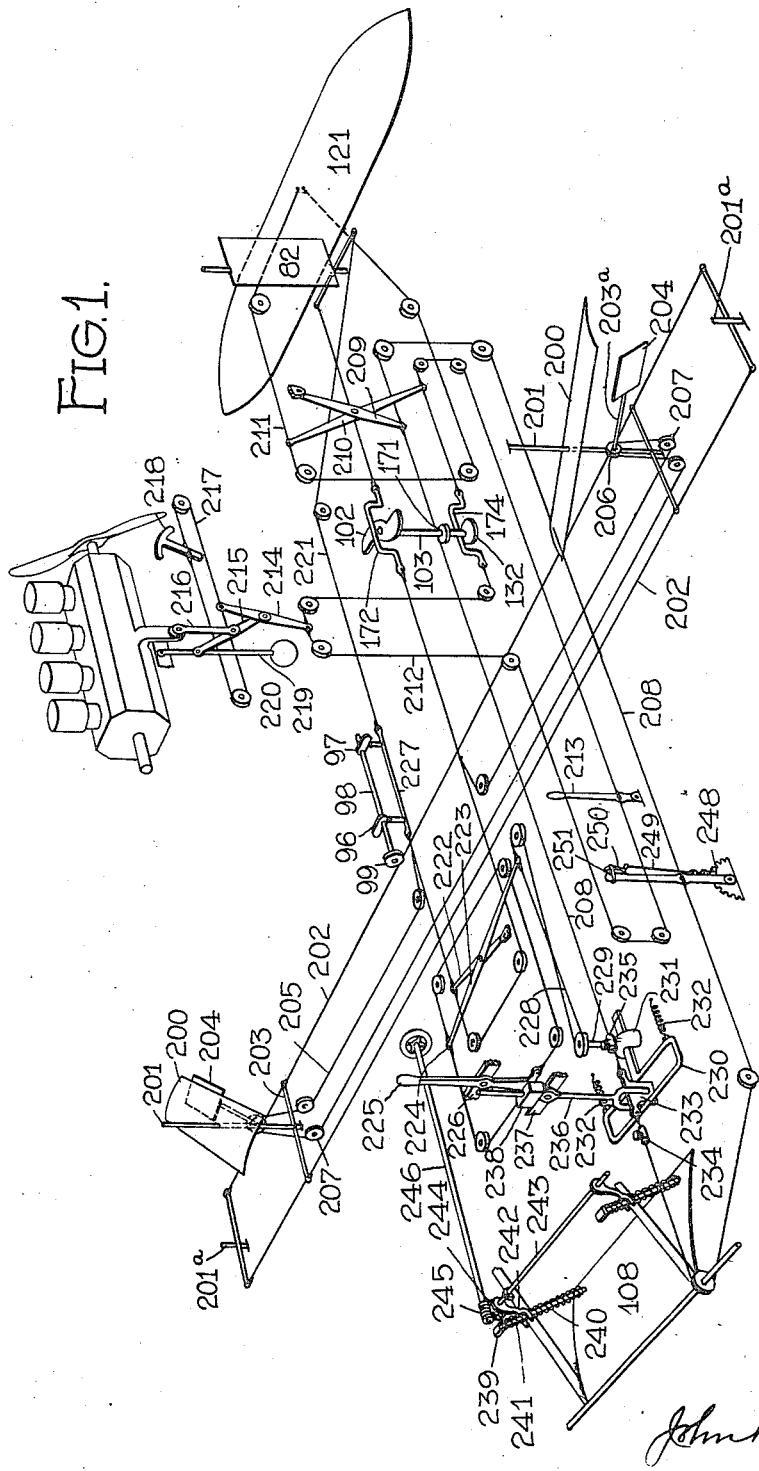
Inventor
John P. Tarbox April 29, 1924.
J. P. TARBOX
BALANCING MECHANISM FOR AIRCRAFT
Original Filed Feb. 7, 1913   2 Sheets-Sheet 2
1,492,006
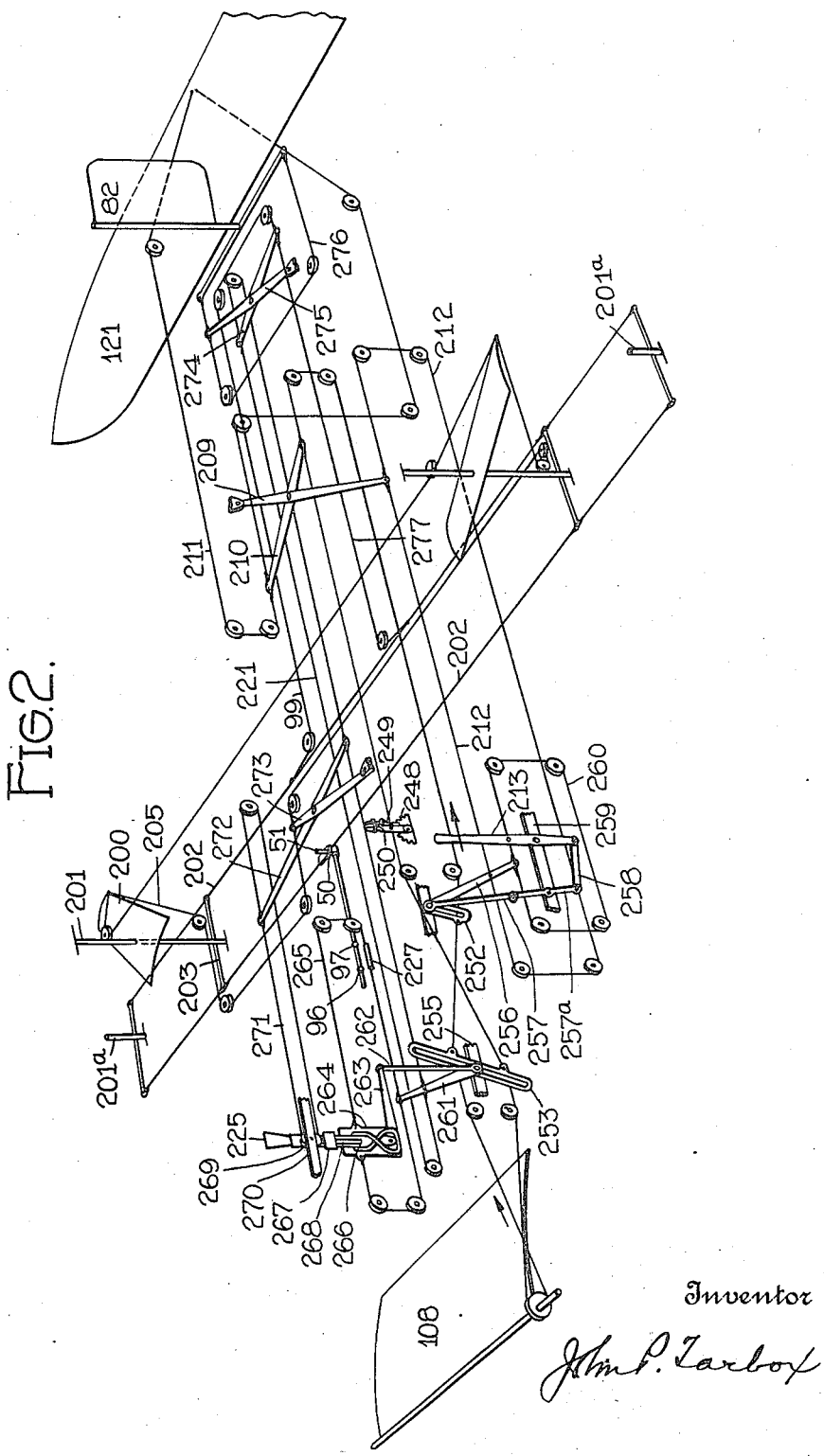
Inventor
John P. Tarbox Patented Apr. 29, 1924.

1,492,006

UNITED STATES PATENT OFFICE.

JOHN P. TARBOX, OF GARDEN CITY, NEW YORK, ASSIGNOR TO TARBOX SAFETY AIRCRAFT CO., OF WASHINGTON, DISTRICT OF COLUMBIA, A CORPORATION OF DELAWARE.

BALANCING MECHANISM FOR AIRCRAFT.

Original application filed February 7, 1913, Serial No. 746,919. Divided and this application filed January 11, 1921. Serial No. 436,410.

*To all whom it may concern:*

Be it known that I, JOHN P. TARBOX, a citizen of the United States, residing at Garden City, in the county of Nassau and State of New York, have invented certain new and useful Improvements in Balancing Mechanisms for Aircraft, of which the following is a specification.

My invention has to do with those relative adjustments and control movements of the stabilizing and control surfaces of an aircraft which ensure effective lateral and longitudinal equilibrium and adherence to course. The particular mechanisms claimed herein are divided out of my co-pending application S. N. 746,919 filed Feb. 7th, 1913, interlocking balancing system. Through these mechanisms several of the fundamental principles of the parent application are applied to the direct operative interconnection of the various stabilizing and control surfaces, i. e. one freed from intermediate servo-motor power devices and therefore decidedly more simple. In the accomplishment of this the power for the purposes of automatic relative adjustments is obtained in the one case from one of the horizontal stabilizing surfaces of the machine and in the other from a set of auxiliary motor surfaces especially provided or constituted.

Of the drawings, Fig. 1 is a diagrammatic illustration arranged in perspective of one such embodiment, and Fig. 2 is a similar illustration of another embodiment.

The numerals applied are those used in the parent application.

The balancing devices shown in Figure 1 are of the type shown in my U. S. Patent No. 1,239,636 granted Sept. 11th, 1917. They comprise lifting vanes 200 mounted substantially in the horizontal plane, or at any slight angle thereto laterally. which may be desirable from the standpoint of advantages obtained through the use of dihedral angle or other well known principles. They are fixed to freely rotate about vertically extending axes 201 mounted in antifriction bearings at the opposite lateral extremities of the craft. They are oblique in the direction of their length to the longitudinal axis of the craft, their lengths converging to a point in advance of the transverse line connecting them. Their outermost ends measured from the axes 201 are longer than the innermost ends, whereby the head resistance or wind pressure on the outermost ends is greater than that on the innermost ends, and whereby the controlling torque brought about by the wind pressure is in opposite directions on the opposite vanes. This may be brought about in any other suitable manner as for instance by the addition of surfaces 204 fixed to the axes on the outboard side in each case.

These vanes are connected together for retention in their normal angular relation as respects each other, and for movement about their axes in unison, by cords 202 connecting longitudinal cross bars 203 secured to the rotatable axes 201.

For a detailed description of the action of these vanes under unbalancing conditions, reference may be made to my patent above referred to. For the purpose herein suffice it to say that when it is desired to bank the craft, movement of the vanes 200 is brought about in a clockwise or anticlockwise direction depending upon the direction of the turn it is desired to make through the operation of the vertical rudder 82 of the craft. In the application aforementioned, this movement of the vanes 200 to bank the craft was brought about through a variation of the connections between the vanes. In Figure 1 it is brought about by changing the relative angle of obliquity of the auxiliary outboard surfaces 204. For this purpose the surfaces 204 are mounted on horizontally extending axes 203ª revolvable in bearings fixed to and rotating with the axes 201, whereby while the axes 203ª are revolvable, they are nevertheless fixed radially with respect to the axes 201 and vanes 200. The normal angle of obliquity of the surfaces 204 is preferably 30° or 40° and in the same direction forwardly whereby there is exerted a lifting effect upon them. Through cord connections 205 with pulleys 206 on shaft 203ª, the connection being made by way of blocks 207 closely adjacent to the axes 201, the surfaces 204 may be freely moved simultaneously in opposite directions, without there being exerted through the cords 205 any torque or restraining force upon axes 201. When the vanes 204 are so moved, that one whose obliquity is increased has greatest wind pressure exerted upon it in the line of flight, and that one whose angle of obliquity is decreased has a less wind pressure exerted upon it. The result is that through this difference of pressure, the vanes 200 are rotated about their axes until an equalization of resultant pressure about the axes on opposite sides of the craft takes place. This is brought about through the increase of pressure on the long end of that vane 200 which is rotated to a position close to the transverse axis of the craft, as will be well understood, the vane 200 in this position having a greater head resistance and secondly having a greater torque exerted upon it on the outboard side. This will be readily understood from what has previously been said about the vanes 60 of Figure 1A.

The pressure responsive device 108 operates the horizontal rudder 121 automatically through cords 208. These cords connect with rudder 121 through differential 209—210 and cords 211. A manual operating lever 213 also connects with the horizontal rudder through differential 209—210, connection being made by cords 212. Cords 212 connect with arm 214 of the throttle lever 216. Connected with the opposite end of arm 214 is cord 217 secured to foot lever 218 whereby the throttle may be manually controlled. Intermediate lever 215 connects at one point with lever 214 at its middle directly with throttle lever 216 and at the other end with standard of position 219 connected with fixed part 220, whereby the throttle is operated to vary the supply of power in accordance with the position of the craft.

Vertical rudder 82 is operated through cords 221 to which are connected cords 205 for operating the controlling surfaces 204 of the vanes 200 whereby when the vertical rudder 82 is moved to make a turn, the surfaces 204 are operated in the proper direction to rotate the vanes 200 to properly bank the chaft. Manual operation of the vertical rudder 82 is effected through differential 222—223 connecting by cords 224 with manual operating lever 225. The locking device 96—97—98—99 is connected with cords 202 of the balancing devices 200. The interlocking member 227 is connected directly in cords 221. One of the abutments 96 and 97 is rotated into the path of movement of the abutments on member 227 whenever the balance of the craft is not such as to warrant a turn in the direction desired. The lost motion connection 50—51 of Figure 1A of my Patent No. 1,367,839, of which this is a division, has not been shown but it is understood that it will be included in the connection of the cords 202 with pulley 99. The operation of this device has been fully explained in connection with Figure 1A of the parent application.

Connected with differential 222—223 is an operating cord 228 through which vertical rudder 82 may also be operated. This cord is operated from a pulley on rotatable shaft 229 having at its lower end a hub 231 having a sliding connection with the trunk of a T-shaped member 230, the transverse part of which is slotted. Within this slot slides a block 233 having sliding connection between abutments 234—235 with cord 208 connected with pressure responsive device 108. Springs 232 at opposite ends of member 230 retain it and the shaft 229 in a central normal position. A fork on the lower end of lever 236 pivoted to fixed point 237, straddles a block 233. The upper end of lever 236 passes through a block 238 pivotally connected with lever 225 and constitutes a lost motion device. The distance of the fixed point 237 from the block 238 may be made as small or as great as desired, thus introducing a greater or less degree of lost motion between the lever 225 and the lever 236.

As long as the craft is moving straight ahead, the variations of pressure on the device 108 cause it to operate cords 208 and automatically govern the longitudinal balance of the craft through connections with the horizontal rudder 121. During this time the member 230 is moved back and forth against the pressure of the springs 232 (which is far less than the controlling force of device 108) without affecting the normal position of the shaft 229. Also the amount of lost motion between block 233 and abutments 234—235 is such that unless pressure conditions are abnormal, abutments 234 and 235 do not engage the block 233. When, however, lever 225 is moved to make a turn, the block 233 is moved to one end or the other of the slot in member 230, this by the first operation of movement of the lever 225. Thereafter as is well understood, the block 238 simply slides upon the upper end of the lever 236 without producing any appreciable movement thereof. Thus block 233 is placed in one end or the other of the slot in member 230 in accordance with the direction of the turn contemplated. Thereafter should the speed of the craft fall, or should the wind pressure on device 108 be reduced for any reason whatsoever, the engagement of abutment 235 with block 233 under these conditions, will rotate shaft 229 and through its operation of vertical rudder 82, reduce the angle of turn to the safe value under existing conditions. Under conditions of extremely reduced pressure in which no turn at all would be warranted, the extreme movement of device 108 might entirely nullify the action of rudder 82.

The degree of effect of the device 108 upon the rudder 82 may of course be made anything desired by the simplest imaginable proportioning of the intermediate connections.

The value of this differential interlock between the pressure responsive device 108, the manual control lever 225 and the vertical rudder 82 lies not only in the fact that dangerous turns under adverse conditions of speed and pressure are prevented as in the case of the system of my parent application, but also and perhaps more greatly in the fact that the angle of turn once commenced, will be reduced should conditions after the turn is commenced make its continuance at the same angle dangerous. It is a well known fact that several fatal accidents have occurred through the making of a sharp turn at substantially right angles to the direction of the wind. This has usually happened when the craft was going against the wind and its actual speed was comparatively low. Upon turning at substantially right angles to the direction of the wind at this low velocity, the sustaining force has been inadequate to maintain the craft under control or to sustain it in the air at all. With the system of my invention as shown in Figure 1, immediately that the pressure on device 108 begins to fall, as it assuredly will as soon as the turn is commenced under the described conditions, the angle of the turn is decreased proportionately, and although the aviator may maintain manual control through lever 225 in its extreme position, the craft is positively prevented from taking a turn sharper than is warranted at any instant by the then existing conditions. A study of the operation of this interlock will show that its effect is not sudden and irregular, but is easy and uniform as are the variations in pressure on the device 108. The aviator is thus not disturbed through the automatic action of this interlock.

I have herein shown also the positive stop interlocks 102 and 132 of the parent case, associated respectively with rudders 82 and 121. The device 102 may be entirely omitted if desired when the device 230 is incorporated. The device 230 is not subject to the objection that an aviator may find with the device 102 in that the device 102 is a positive stop and is liable to disturb manual operation to a slight extent until one becomes used to it.

The pressure responsive device 108 which is the front stabilizing surface of the aeroplane is of form shown in Figure 3 of the parent application, is biased against wind pressure through springs 240 on rods 239 pivotally connected at one end to the device 108 and passing through apertures in the outriggers or other fixed part of the craft. The upper ends of the rods 239 are headed over or provided with nuts to confine springs 241 on the rod between heads 239 and forks 242 on a transverse shaft 243 mounted in suitable bearings. This shaft is rotatable through the gear and worm 244 and 245 from longitudinally extending shaft 246 provided with manually operable hand wheel 247. By altering the position of the forks 242, the pressure of springs 241 is altered and the resultant pressure of springs 240 is therefore altered without in any way affecting the freedom of movement of device 108. Thus the normal balancing angle of the craft may be freely altered by the aviator from his seat without in any wise interfering with the balancing functions of device 108.

The cut-out for the pressure responsive device 108 in the form of lever 249 connected with cord 208, is provided as in the case of the system of Figures 1$^A$ and 1$^B$.

Referring now to Figure 2, similar devices and similar parts have been similarly numbered. The embodiment of Figure 2 differs from that of Figure 1 principally in the character of the interlocks between the pressure responsive device 108, and the horizontal and vertical rudders 121 and 82. Instead of providing positive stop interlocks of the type of Figures 1$^A$ and 1$^B$ of the parent case (the interlocks 102—132), these interlocks are entirely omitted and interlocks functioning as does the device 230 of Figure 1 are substituted. The form of these interlocks, however, is decidedly different from that of Figure 1. In the system of Figure 2 they consist respectively of links 252—253, pivoted link 253 at its middle and link 252 at one end as shown by larger dotted line circle to fixed parts 254 and 255. These links are respectively oscillatable about their pivots by connection with the cords 208 between the pressure responsive device 108 and the horizontal rudder 121. Obviously the positions of the links are indicative of the speed and pressure conditions as measured by the device 108.

Connected with link 252 by means of any suitable slide in the slot thereof is lever 256 having connections at an intermediate point with manual operating cords 212 for the horizontal rudder 121, and having connection at its opposite end with cords 260 connected with manual operating lever 213. As shown in the normal position of the lever 256, its connection with the slot in link 252 lies directly over the pivotal point of link 252 with the fixed part 254. By means of the link connection 257—257$^a$ of this end of the lever 256 to arm 258 on control lever 213, the lever 256 is shifted longitudinally of the link 252 to carry its point of connection thereto away from the pivot toward one end of the slot whenever the control lever 213 is moved. For the purposes of clarity, the link 252, the lever 256 and the link 257 have been shown at an angle to each other. This is the relative position they would occupy under abnormal conditions of pressure and speed of device 108 when the control lever 213 was moved. But under normal conditions of flight, it is to be understood that the link 252 and the lever 256 are substantially parallel, and likewise at substantially right angles to the connections 208, 212 and 260. These connections are laterally freely flexible and of such length as to permit such lateral movement without substantial lost motion in the cables.

Under these normal conditions whenever control lever 213 is moved, the lever 256 is moved longitudinally and its pivotal connection with link 252 shifted toward one end of the slot. The link 252 being substantially parallel with it, however, it exerts no appreciable effect upon its angular position. Through connection 260, however, the angular position of lever 256 is altered to move the horizontal rudder 121 to the desired position, and under such conditions, the movement of the rudder 121 is approximately proportional to the movement of the control lever 213. When the pressure and speed conditions are abnormal, however, the angularity of the link 252 is changed with respect to link 256. As long as the control lever 213 is in normal position, however, and the craft is proceeding in a straight line, this is without effect, for the point of connection of lever 256 to link 252 lies on the pivot of link 252 to fixed part 254. When ascent or descent is attempted under these conditions, however, the point of connection of lever 256 is shifted toward the end of the slot in 252 as described with the result that the intended movement of rudder 121 is either augmented or decreased in accordance with the existing conditions. Thus to take a specific case, when the speed is high, the pressure on device 108 operates a cord 208 in the direction of the arrow and carries link 252 counterclockwise as shown. Then when control lever 213 is moved clockwise to deflect rudder 121 upwardly through connections 212, 209, 210 and 211, the movement of cord 212 and hence of rudder 121 is augmented through the clockwise movement of the upper end of lever 256. Thus an increased angle of ascent is permissible as is warranted by the existing high pressure conditions. Under low pressure and speed conditions, clockwise movement of link 252 would take place, with the result that the upper end of lever 256 would be moved counterclockwise in a direction opposite clockwise movement of lower end, and the movement of rudder 121 to turn the craft upwardly is decreased, and under extreme conditions may be nullified altogether, the lever 256 under such extreme conditions moving as it were about its point of connection to cord 212 as a pivot. The same functioning takes place when the lever 213 is moved counterclockwise to turn the craft downwardly, the point of connection of lever 256 being moved to the lower end of the slot in link 252 as before but with opposite effects.

Thus it is apparent that this differential interlock automatically and instantaneously at all times adjusts the resultant movement of the horizontal rudder to suit the pressure and speed conditions under which the craft is traveling. By suitable proportionment of parts this adjustment may be made such as to remove the control of the craft as far as may be desired from the danger points under adverse conditions. It is thus impossible for an aviator to take such an angle of ascent as to stall his craft or to take such an angle of descent as to plunge it beyond control. Moreover should the control lever 213 be moved to operate the rudder 121 at any instant when, pressure conditions do not justify its operation, and that operation is reduced or annulled through the interlock 252—256, if the control lever is momentarily held in its position, the desired movement of the rudder takes place automatically at the instant pressure and speed conditions warrant it, for ensuing movement of the link 252 operates lever 256 to impart the requisite motion to operating cords 212. This is of extreme value when operating in variable or gusty winds, the effect of which can be gauged by an aviator only with extreme difficulty.

Associated with the link 253 is the control mechanism for the vertical rudder 82. A lever 261, the lower end of which is pivoted slidably and normally centrally of the slot in link 253, is connected at its middle to operating cord 221 which connects the vertical rudder 82 with differential 274—275. The upper end of this lever is connected by cords 265 with bell crank 264 associated with control lever 225. Lever 261 like the lever 256 is normally substantially parallel to link 253 and substantially at right angles to cords 208 and 221. Its lower end is connected by link 262 with the arm 263 of the bell crank 264. The bell crank 264 is connected by the oppositely disposed arms of the spring 266 attached to it, to the operating lever 225 which is independently movable.

Also associated with control lever 225 is the banking connection comprising block 267 pivoted or swiveled to lever 225, pin 268 passing through the block and connected with pulley 269 journaled independently of lever 225 on fixed part 270, and connected by cord 271 with one arm of differential 272—273 connecting with operating cords 205 which extend to the outboard rear extremities of the vanes 200. These extremities of the vanes 200 are made flexible so that they may be warped up or down simultaneously in opposite directions to alter the head resistance and hence the relative torques of the vanes 200 about their axes. The opposite end of the lever 272 of differential 272—273 is connected to control cable 221 leading to the vertical rudder 282 as aforesaid.

The interconnecting cables 202 between the vanes 200 are also connected to operate the vertical rudder 282 by means of cables 277 connecting with the arm 274 of differential 274—275.

The interlock between the vertical rudder 82 and the lateral balancing vanes 200 is provided in this case between the cables 202 and the cable 265 connected with the bell crank 264. A lost motion device of the block and pin type is clearly shown in this connection and it is numbered 50—51. The rotated abutments 96—97 co-operate with abutments 227 carried by the cord 265.

The operation is as follows: As long as pressure and speed conditions are such as to warrant turns of any desired degree, right or left, substantially the entire movement of control lever 225 is imparted to vertical rudder 82. At any instant, however, if the pressure and speed conditions are not such a will warrant the desired turn, the shifting of the lever 261 longitudinally of the slot in link 253 which occurs for each movement of lever 225, decreases to a greater or less degree the resulting movement of the vertical rudder 82 and hence the degree of the resulting turn. Should the craft be traveling at too slow a speed in a straight line to warrant an abrupt turn, such turn cannot be made either to right or to left, and under extreme imaginable conditions, it may be impossible to make such a turn at all. If, however, the operator desires to take the risk, he can cut out the pressure responsive device 108 by locking the same by the use of lever 249. But unless he deliberately chooses to take chances, he is automatically guarded against danger.

Also in making a sharp turn at substantially right angles to the wind, the progressive falling off of the sustaining force as the turn is made effects proportional movement of link 253, with the result that the angle of turn is decreased until the craft gains headway, whereupon and simultaneously the rudder is returned to the point necessary to complete the turn. The operator has only to move the control lever 225 to the position he desires and hold it there, and the craft will take the turn desired at the maximum safe rate.

It is to be observed that as in case of the system of Figure 1^A of the parent case, initial movement of the control lever 225 effects through lost motion device 267—268 flexing of the outer ends of vanes 200, with the result that the craft is given an initial angle of bank. A tracing of the connections will show that the effect of flexing the vanes 200 is the same as changing the angle of obliquity of the auxiliary surfaces 204 of Figure 1. Subsequent to this, the angle of bank is increased in proportion to the increase in the degree of the turn by means of the connection of cable 221 with differential 272—273. The combined action of gravity and the equalization of the pressures on the vanes 200 after the bank is entered upon, acts to limit the angle of bank to a definite value for each angle of turn as described in my Patent No. 1,239,636 above referred to. Adjustable masses and surfaces connected with the axes 201 are not shown but they may be used if desired as shown in Figures 1^A and 2 of the parent case herein and also in the patent referred to.

If the craft happens to be unbalanced in a direction opposite to that in which it is desired to make a turn, the interlock 96—97—227 prevents movement of cable 265 to operate vertical rudder 82 until the balance is restored to a predetermined point, which may be at normal, or on one side or the other of normal as choice may decide. Under such conditions, the yielding connection 266 between lever 225 and bell crank 264 prevents springing or breaking of parts upon sudden and improper movements of control lever 225 under these conditions. In fact lever 225 may be moved against the tension of spring 266 to institute the turn, and as soon as the balance is restored to a point warranting the turn, cable 265 and bell crank 264 are released, and under the tension of spring 266 are moved automatically to operate the rudder 82 to the desired point. The initial movement of control lever 225 under these conditions preliminarily operates cable 271 to flex the vanes 200 to bring about the initial angle of bank. This action facilitates the restoration of balance, through the resulting increase in corrective forces exerted by the vane 200 on the lower side and corresponding decrease of lifting force of vane 200 on the high side. These operations are substantially as in the system of Figures 1^A and 1^B of the parent case.

If desired, the form of the differential interlock between pressure responsive device 108 and horizontal rudder 121 may be made the same as that between device 108 and vertical rudder 82. In such case, the link 252 will be centrally pivoted instead of pivoted at one end, and connection made with lever 213 by means of connection of link 257 with a suitable bell crank connected with the lever. In such case, however, the differential action of the link 252 will be the same whether rudder 121 is turned up or down, just as in case of vertical rudder 82, the effect is the same whether rudder 82 is turned to right or to left. In other words if the effect of device 108 augments the movement of the rudder in one direction at any instant, it will at the same instant should movement of the rudder be in the opposite direction similarly augment that movement. The construction illustrated, however, is preferred.

Through the connection 277, to the vertical rudder 82, the rudder serves as a tail vane, steadying the action of the balancing vanes 200.

A plurality of balancing vanes 200 may be connected in multiple to transverse cables 202 as indicated clearly by the additional axes 201ª beyond the axes 201. The vanes 200 on these additional axes 201ª may be mounted in the same plane or in different planes from the vanes 200, but the essential feature is that their movement about the axes takes place in unison. The advantage of the multiple number of balancing vanes 200 as distinguished from a single very large vane on each side of the craft is that the moment of inertia is much smaller, whereby the action is faster. Of course the outer ends of these additional vanes 200 may be arranged to be flexed as are the ends of these vanes 200 illustrated. Or else additional surfaces 204 may be used in connection with the axes 201ª.

Obviously these mechanisms may be used for the relative adjustment of other forms of surfaces than those described, and the mechanisms themselves may be varied in form without departing from the real spirit of applicant's invention. Applicant would have it understood that the appended claims are intended to cover all embodiments of his invention not departing from its generic spirit.

What I claim is:

1. In an aircraft, a rudder, anemometric means connected to directly effect actuation of said rudder, manually operable control means also connected to effect actuation of the rudder, and an anemometrically controlled means to regulate the extent of movement of the rudder effected by said manually operable means.

2. In an aircraft, a speed responsive anemometer device and vertical rudder, operating means for the rudder connected to actuate the rudder independently of the anemometer device, and anemometrically controlled means to modify the said actuation of the rudder in accordance with the speed of the craft and independently of the manual control.

3. In combination an anemometer device, a rudder, operating means therefor, a direct operating connection between the anemometer device and the rudder effective to operate the rudder independently of the first named operating means, and means for at will locking out the anemometer operating connection.

4. In an aircraft automatic lateral balancing means, embodying mechanism to modify the normal operation thereof, directional steering means for the craft and control means therefor connected together to differentially actuate said modifying mechanism.

5. In an aircraft automatic lateral balancing means, embodying mechanism to modify the normal operation thereof, directional steering means for the craft and control means therefor connected together to differentially actuate said modifying mechanism, and embodying a variable ratio connection to said control means.

6. In an aircraft a propelling motor, control means therefor, and a standard of position with respect to the earth governing said control means.

7. In an aircraft, an adjustable horizontally disposed stabilizing surface, an elevating rudder connected therewith and lying in the rear thereof, means for adjusting the stabilizing surface from the seat of the operator, which adjusting means by reason of said interconnection also moves said elevating rudder in the adjusting movement, and independently operable means for actuating the elevating rudder.

8. In an aircraft, an elevating rudder, and a horizontally disposed stabilizing surface connected to directly operate said elevating rudder and normally yieldingly held in a determinate angular relation to the air rush independently of said elevating rudder.

9. In an aircraft a horizontal stabilizing surface normally yieldingly held in a determinate angular relation to the air-rush, an elevating rudder operated directly thereby, and means for locking said stabilizing surface in adjusted positions.

10. In an aircraft an adjustable horizontally disposed stabilizing surface, a flexible adjusting connection extending from the stabilizer to a point adjacent the operator's seat, a self locking manipulating member at that end of the connection, an elevating rudder and operating means therefor independent of said adjusting connection.

11. In an aircraft a horizontally disposed stabilizing surface adjustable about its leading edge, adjusting means connecting with its trailing edge, an elevating rudder in the rear thereof connected to partake of the adjusting movement imparted the stabilizing surface, and means for operating said rudder independently of said adjusting means.

12. In an aircraft, a longitudinally projecting frame, a horizontal stabilizing surface adjustable about an axis extending transversely of said frame, an adjusting shaft connected with said stabilizing surface and also extending transversely of said frame, a worm gear carried by said shaft, means for operating the worm gear from the operator's seat, an elevating rudder and operating means therefor independent of said stabilizer adjusting means.

13. In an aircraft a longitudinally projecting frame, a horizontal stabilizing surface adjustable about an axis extending transversely of said frame, an adjusting shaft connected with said stabilizing surface and also extending transversely of said frame, a worm gear carried by said shaft, means for operating the worm gear from the operator's seat, an elevating rudder connected to partake of the adjusting movement imparted the stabilizing surface, and means for operating said rudder independently of said adjusting means.

14. In an aircraft, a longitudinally projecting frame, a horizontal stabilizing surface adustable about an axis extending transversely of said frame, means for adjusting said surface from the operator's seat including a self-locking mechanical device whereby the surface is retained in its adjusted position when the adjusting means is released by the operator, an elevating rudder, and operating means for said elevating rudder independent of said stabilizer adjusting means.

In testimony whereof I hereunto affix my signature.

JOHN P. TARBOX.